(12) United States Patent
Sivakumar et al.

(10) Patent No.: US 11,736,336 B2
(45) Date of Patent: Aug. 22, 2023

(54) REAL-TIME MONITORING OF MACHINE LEARNING MODELS IN SERVICE ORCHESTRATION PLANE

(71) Applicant: International Business Machines Corporation, Armonk, NY (US)

(72) Inventors: Gandhi Sivakumar, Bentleigh (AU); Kushal S. Patel, Pune (IN); Luke Peter Macura, Lucas (AU); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 17/236,167

(22) Filed: Apr. 21, 2021

(65) Prior Publication Data
US 2022/0345353 A1    Oct. 27, 2022

(51) Int. Cl.
*H04L 41/02* (2022.01)
*H04L 41/0213* (2022.01)
(Continued)

(52) U.S. Cl.
CPC ......... *H04L 41/0213* (2013.01); *G06N 20/00* (2019.01); *H04W 24/02* (2013.01)

(58) Field of Classification Search
CPC .... H04L 41/0213; G06N 20/00; H04W 24/02
See application file for complete search history.

(56) References Cited

U.S. PATENT DOCUMENTS 6,021,113 A    2/2000 Doshi et al.
6,845,393 B1   1/2005 Murphy et al.
(Continued)

FOREIGN PATENT DOCUMENTS

EP    3092776 A1    11/2016
WO    2014113367 A1    7/2014

OTHER PUBLICATIONS

Ericsson, "Optimizing Network Applications for 5G," https://www.ericsson.com/en/news/2017/4/optimizing-network-applications-for-5g, Apr. 21, 2017, pp. 1-3.
(Continued)

*Primary Examiner* — Curtis B Odom
(74) *Attorney, Agent, or Firm* — Robert A. Voigt, Jr.; Shackelford, Bowen, McKinley & Norton, LLP (57) ABSTRACT

A computer-implemented method, system and computer program product for performing real-time monitoring of machine learning models. Real-time model state data and metadata (e.g., operating dataset) of the machine learning models located within an orchestration plane of a network are collected by agents located within the machine learning models. The portion of the collected real-time model state data and metadata that is to be provided to the user by the service orchestrator (configured to monitor the machine learning models in the service orchestration plane via the use of agents in the machine learning models) is selected and marked. The marked collected real-time model state data and metadata are then provided to the user by the service orchestrator. In this manner, real-time monitoring of the machine learning models in the orchestration plane, such as the service orchestration plane, of a broadband cellular network (e.g., fifth generation broadband cellular network) is achieved.

20 Claims, 7 Drawing Sheets

(51) Int. Cl.
    *H04W 24/02*    (2009.01)
    *G06N 20/00*    (2019.01)

(56) References Cited

U.S. PATENT DOCUMENTS

2020/0151619 A1* 5/2020 Mopur ................... H04L 67/12
2020/0177463 A1  6/2020 Trim et al.

OTHER PUBLICATIONS

Anonymously, "Method and Apparatus for Standards-Based Real-Time Management and Monitoring of Cluster-Based Machine Learning Models," ip.com, IPCOM000262300D, May 18, 2020, pp. 1-3.
Myeongjung Park, "A Monitoring System for Machine Learning Models in a Large-Scale Context," Thesis, Master of Science in Computer Science, Delft University of Technology, Aug. 21, 2020, pp. 1-65.
ChristopherGS, "Monitoring Machine Learning Models in Production," https://christophergs.com/machine%20learning/2020/03/14/how-to-monitor-machine-learning-models/, Mar. 14, 2020, pp. 1-21.
International Telecommunication Union, "Unifiied Architecture for Machine Learning in 5G and Future Networks," https://www.itu.int/en/ITU-T/focusgroups/ml5g/Documents/ML5G-delievrables.pdf, Jan. 2019, pp. 1-32.

* cited by examiner

REAL-TIME MONITORING OF MACHINE LEARNING MODELS IN SERVICE ORCHESTRATION PLANE

TECHNICAL FIELD

The present disclosure relates generally to machine learning models, and more particularly to real-time monitoring of machine learning models in a service orchestration plane of a network, such as a broadband cellular network (e.g., fifth generation broadband cellular network).

BACKGROUND

Machine learning is the study of computer algorithms that improve automatically through experience and by the use of data. Machine learning algorithms build a model ("machine learning model") based on sample data, known as "training data," in order to make predictions or decisions without being explicitly programmed to do so. Machine learning algorithms are used in a wide variety of applications, such as email filtering and computer vision, where it is difficult to develop conventional algorithms to perform the needed tasks.

A machine learning model is a file that has been trained to recognize certain types of patterns. A machine learning model may be trained over a set of data, providing it an algorithm that it can use to reason over and learn from these data. There are various types of machine learning models that use a variety of machine learning algorithms, such as linear regression, logistic regression, decision tree, support-vector machine (SVM), Naive Bayes, k-nearest neighbors algorithm (k-NN), k-means clustering, random forest, etc.

SUMMARY

In one embodiment of the present disclosure, a computer-implemented method for performing real-time monitoring of machine learning models comprises collecting real-time model state data and metadata of the machine learning models located within an orchestration plane of a network by agents located within the machine learning models. The method further comprises marking a portion of the collected real-time model state data and metadata that was selected to be provided to a user of a computing device. The method additionally comprises providing the marked collected real-time model state data and metadata to the user of the computing device.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

As stated in the Background section, machine learning is the study of computer algorithms that improve automatically through experience and by the use of data. Machine learning algorithms build a model ("machine learning model") based on sample data, known as "training data," in order to make predictions or decisions without being explicitly programmed to do so. Machine learning algorithms are used in a wide variety of applications, such as email filtering and computer vision, where it is difficult to develop conventional algorithms to perform the needed tasks.

A machine learning model is a file that has been trained to recognize certain types of patterns. A machine learning model may be trained over a set of data, providing it an algorithm that it can use to reason over and learn from these data. There are various types of machine learning models that use a variety of machine learning algorithms, such as linear regression, logistic regression, decision tree, support-vector machine (SVM), Naive Bayes, k-nearest neighbors algorithm (k-NN), k-means clustering, random forest, etc.

In a cognitive system, which uses cognitive computing, natural language processing and machine learning to enable people and machines to interact more naturally to extend and magnify human expertise and cognition, there could be many different machine learning models with different functions and operation feature sets to produce different outcomes. By having a variety of machine learning models, the cognitive system is enhanced in its ability to enable people and machines to interact more naturally.

Such a cognitive system may utilize a broadband cellular network, such as the fifth generation technology standard for the broadband cellular network ("5G"). In such an architecture, dissimilar machine learning models reside in the service orchestration plane. The service orchestration plane introduces a parent level of abstraction that alleviates the need for other services to manage interaction details required to ensure that service operations are executed in a specific sequence.

As discussed above, in the service orchestration plane, there are multiple dissimilar machine learning models, each operating with different training datasets, using different algorithms to train the model using the different training datasets. Once the machine learning model is selected to be utilized, the outcome of the machine learning model needs to be evaluated in real-time as to the accuracy of the prediction, including in situations involving automated audits of the machine learning model. Unfortunately, there is not currently a means for performing real-time monitoring of the machine learning models in the service orchestration plane. As a result, the performance of such machine learning models in the service orchestration plane may be unknown.

The embodiments of the present disclosure provide a means for performing real-time monitoring of the machine learning models in the service orchestration plane.

In some embodiments of the present disclosure, the present disclosure comprises a computer-implemented method, system and computer program product for performing real-time monitoring of machine learning models. In one embodiment of the present disclosure, real-time model state data and metadata (e.g., type of machine learning model, an operating dataset, features of a quorum configuration, attributes of the machine learning models, etc.) of the machine learning models located within an orchestration plane of a network are collected by agents located within the machine learning models. In one embodiment, such agents utilize the simple network management protocol (SNMP) and are referred to herein as the "SNMP agents." The portion of the collected model state data and metadata that is to be provided to the user by the service orchestrator (configured to monitor the machine learning models in the service orchestration plane via the use of agents in the machine learning models) is selected and marked. In one embodiment, such information (model state data and metadata) may be selected based on input received from an expert. In one embodiment, such information (model state data and metadata) may be selected based on prior information previously captured by the SNMP agents. In one embodiment, the selected information (model state data and metadata) to be provided to the user by the service orchestrator is marked by setting a value to a flag associated with such information. The marked collected real-time model state data and metadata are then provided to the user by the service orchestrator. In this manner, real-time monitoring of the machine learning models in the orchestration plane, such as the service orchestration plane, of a broadband cellular network (e.g., fifth generation broadband cellular network) is achieved.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Figure 1:
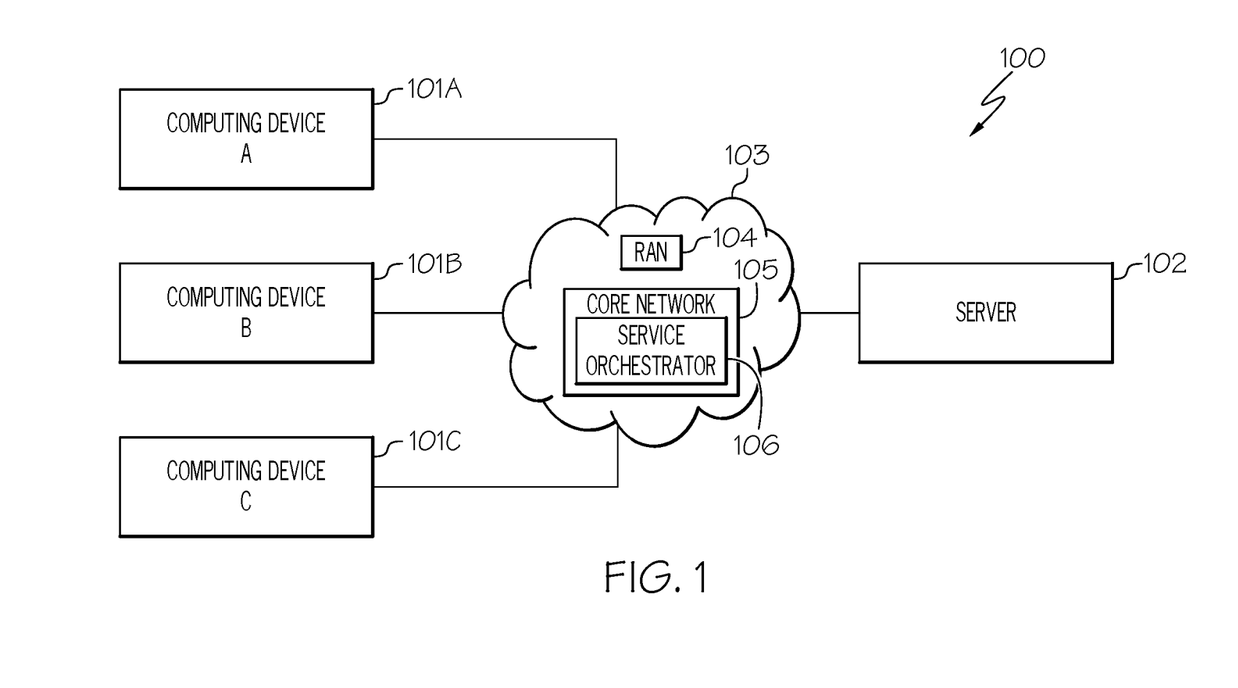
FIG. 1 illustrates a communication system for practicing the principles of the present disclosure in accordance with an embodiment of the present disclosure.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a server 102 via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), laptop computer, mobile device, tablet personal computer, smartphone, mobile phone, navigation device, gaming unit, and the like) configured with the capability of connecting to network 103 and consequently communicating with other computing devices 101 and server 102.

Network 103 may be, for example, a broadband cellular network, such as the fifth generation (5G) broadband cellular network.

Server 102, as used herein, may be computer hardware or software that provides functionality for other programs or devices. In one embodiment, server 102 provides various functionalities, often called "services," such as sharing data or resources among multiple computing devices 101 or performing computation for a computing device 101.

In one embodiment, server 102 is a web server configured to offer a social networking and/or microblogging service thereby enabling users of computing devices 101 to send and read other users' posts. "Posts," as used herein, include any one or more of the following: text (e.g., comments, sub-comments and replies), audio, video images, etc.

In one embodiment, server 102 is configured to host websites (website is a collection of relevant webpages that is addressed to a Uniform Resource Locator (URL)) and serve contents to the World Wide Web. For example, server 102 may host a website in which its collection of relevant webpages are accessed by a user of computing device 101, such as via a web browser (software application for accessing information on the World Wide Web) on computing device 101. Furthermore, server 102 is configured to process incoming network requests over HTTP (Hypertext Transfer Protocol) and several other related protocols.

In one embodiment, as shown in FIG. 1, broadband cellular network 103, such as the 5G broadband cellular network, has an infrastructure of a radio access network (RAN) 104, which consists of various types of facilities, including small cells, towers, masts and dedicated in-building and home systems that connect mobile users and wireless devices to the main core network. Furthermore, as shown in FIG. 1, network 103 further includes the infrastructure of a core network 105, which is the mobile exchange and data network that manages all of the mobile voice, data and internet connections. In one embodiment, core network 105 includes distributed servers across the network.

In one embodiment, core network 105 includes a device, referred to herein as the "service orchestrator" 106, configured to monitor the machine learning models in the service orchestration plane of network 103. In one embodiment, service orchestrator 106 is configured to perform orchestration on network 103. "Orchestration," as used herein, refers to the automated configuration, management and coordination of computer systems, applications and services. In one embodiment, in connection with such orchestration, service orchestrator 106 includes a service orchestration plane that includes multiple dissimilar machine learning models, each operating with different training datasets, using different algorithms to train the model using the different training datasets. The service orchestration plane introduces a parent level of abstraction that alleviates the need for other services to manage interaction details required to ensure that service operations are executed in a specific sequence. A further discussion regarding the service orchestration plane is provided further below in connection with FIG. 2.

In one embodiment, service orchestrator 106 is configured to monitor the machine learning models in the service orchestration plane of network 103 via the use of SNMP (simple network management protocol) agents in the machine learning models as discussed in further detail below. A description of the hardware configuration of service orchestrator 106 is provided further below in connection with FIG. 3.

System 100 is not to be limited in scope to any one particular network architecture. System 100 may include any number of computing devices 101, servers 102, networks 103, RANs 104, core networks 105 and service orchestrators 106.

A discussion regarding the service orchestration plane is provided below in connection with FIG. 2.

Figure 2:
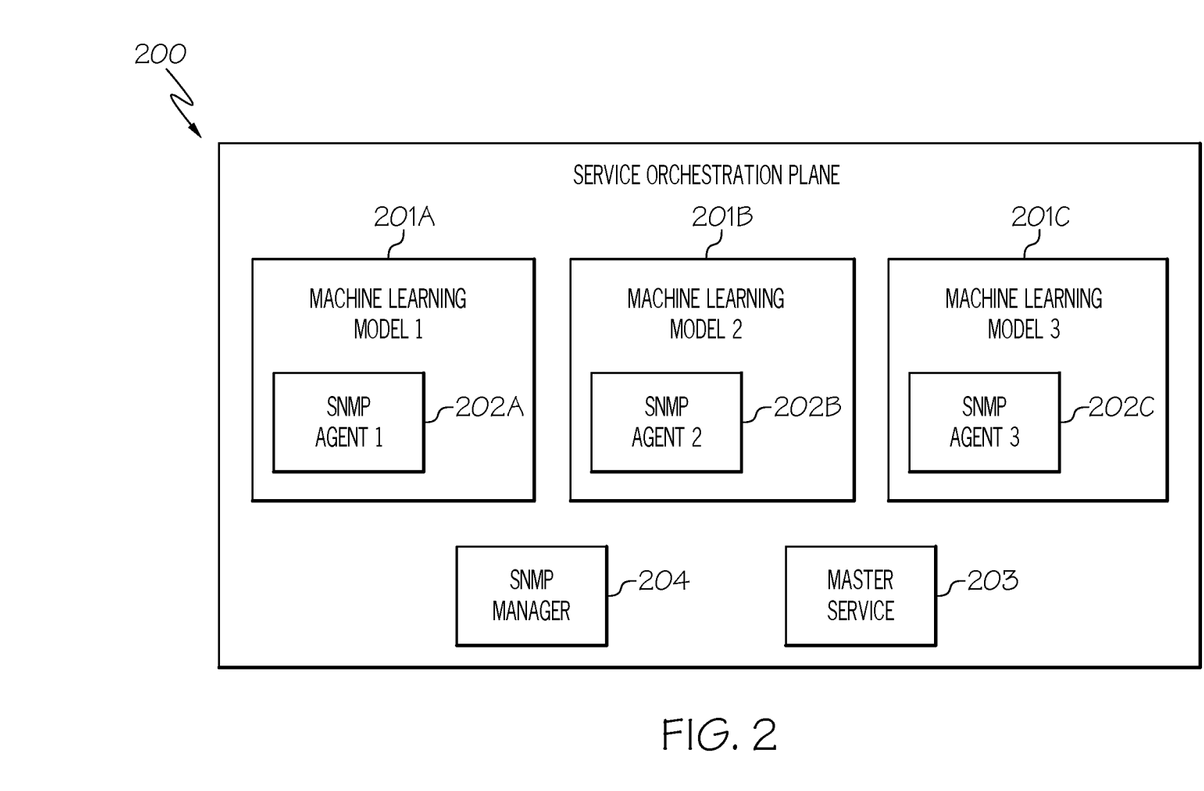
FIG. 2 is a diagram of the software components of the service orchestration plane in accordance with an embodiment of the present disclosure.

FIG. 2 is a diagram of the software components of the service orchestration plane 200 in accordance with an embodiment of the present disclosure.

Referring to FIG. 2, service orchestration plane 200 includes machine learning models (MLMs) 201A-201C (identified as "Machine Learning Model 1," "Machine Learning Model 2," and "Machine Learning Model 3," respectively, in FIG. 2). Machine learning models 201A-201C may collectively or individually be referred to as machine learning models 201 or machine learning model 201, respectively. A machine learning model 201, as used herein, is a file that has been trained to recognize certain types of patterns. In one embodiment, machine learning models 201 are hosted on different environments (e.g., edge cloud, core cloud locations over a virtual machine infrastructure).

In one embodiment, service orchestration plane 200 includes dissimilar machine learning models 201, each operating with different training datasets, using different algorithms to train the model using the different training datasets. In one embodiment, the performance of such machine learning models 201A-201C is monitored using agents, referred to herein as the simple network management protocol (SNMP) agents 202A-202C, respectively (identified as "SNMP Agent 1," "SNMP Agent 2," and "SNMP Agent 3," respectively, in FIG. 2). SNMP agents 202A-202C may collectively or individually be referred to as SNMP agents 202 or SNMP agent 202, respectively. SNMP, as used herein, refers to an Internet Standard protocol for collecting and organizing information about managed devices on IP networks and for modifying that information to change device behavior. In one embodiment, such a protocol is utilized by agents 202. As a result, such agents are referred to herein as "SNMP agents."

In one embodiment, SNMP agents 202 are configured to collect real-time model state data and metadata of machine learning models 201. In one embodiment, each agent 202 (e.g., SNMP agent 202A) residing within machine learning model 201 (e.g., machine learning model 201A) collects real-time model state data and metadata for that machine learning model 201. For example, SNMP agent 202A collects real-time model state data and metadata for machine learning model 201A. In another example, SNMP agent 202B collects real-time model state data and metadata for machine learning model 201B. In a further example, SNMP agent 202C collects real-time model state data and metadata for machine learning model 201C. While FIG. 2 illustrates three machine learning models 201 and three SNMP agents 202, it is noted that service orchestration plane 200 may include any number of machine learning models 201 and SNMP agents 202.

In one embodiment, the collected real-time model state data and metadata include the type of machine learning model (e.g., binary classification, multiclass classification and regression), an operating dataset, features of a quorum configuration, attributes of the machine learning models, etc. A quorum configuration, as used herein, refers to a cluster of physical servers that should be active at any given time. Features of such a quorum configuration may include the particular physical services that are currently active. Furthermore, examples of attributes of the machine learning models, include, but not limited to, modeling tasks, predictions, algorithm used (e.g., decision tree, random forest, k-nearest neighbors (k-NN), etc.), errors, input data attributes, etc.

In one embodiment, SNMP agents 202 collect such information using Internet of Things (IoT) sensors embedded with software for the purpose of monitoring and collecting information (e.g., features of a quorum configuration, attributes of the machine learning models) and exchanging such data with SNMP agents 202.

In one embodiment, SNMP agents 202 collect such information via log files that are generated by machine learning models 201. A log file, as used herein, refers to a file that records events that occur in machine learning models 201, such as modeling tasks, predictions, errors, etc.

In one embodiment, SNMP agents 202 collect metadata (data about data) generated by its associated machine learning model 201, such as features and model functions used as input, settings and other inputs used, performance of the training, test and validation, type and amount of resources required to train, type of model, operating data set, version of data set, etc.

Referring again to FIG. 2, service orchestration plane 200 further includes a master service 203 configured to connect SNMP agents 202 with services.

Furthermore, as shown in FIG. 2, service orchestration plane 200 includes an SNMP manager 204 configured to manage SNMP agents 202 in terms of when to collect real-time model state data and metadata of their associated machine learning models 201 as well as when to send such collected information that is marked to be provided to SNMP manager 204.

A further description of these and other functions is provided below in connection with the discussion of the method for performing real-time monitoring of machine learning models 201 (FIG. 2) residing within service orchestration plane 200 (FIG. 2) of a broadband cellular network (e.g., network 103 of FIG. 1).

Prior to the discussion of the method for performing real-time monitoring of machine learning models 201 residing within service orchestration plane 200 of broadband cellular network 103, a description of the hardware configuration of service orchestrator 106 (FIG. 1) is provided below in connection with FIG. 3.

Figure 3:
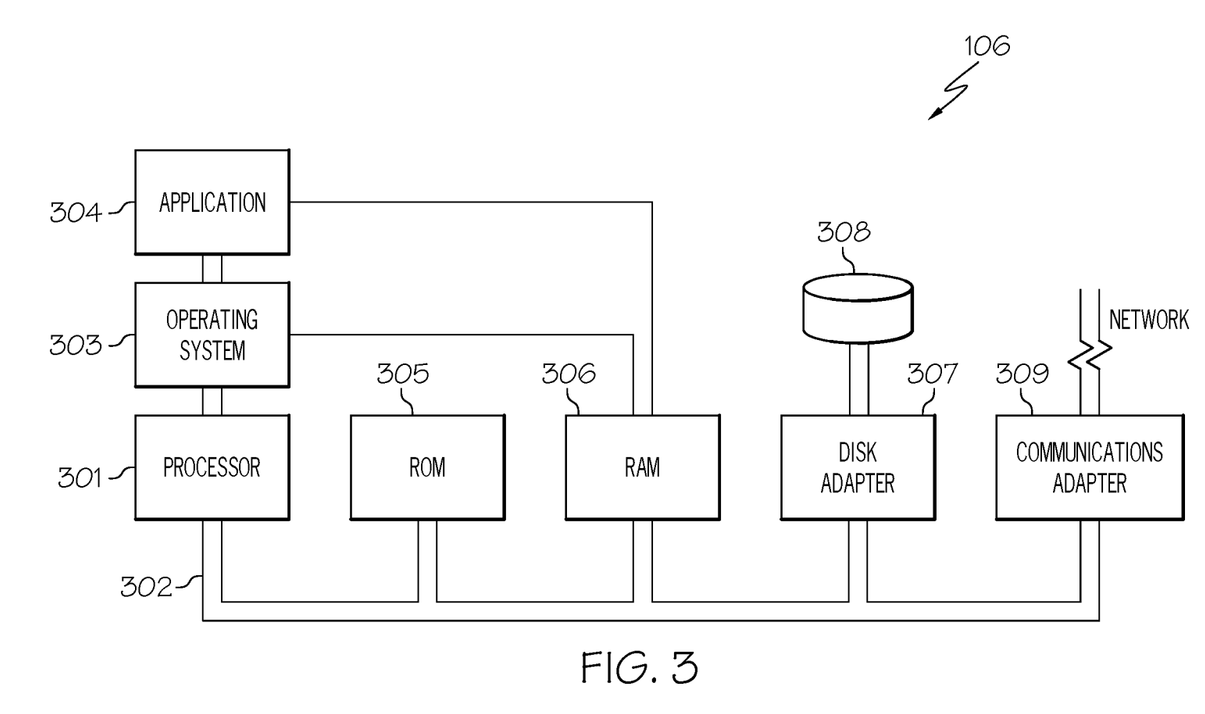
FIG. 3 illustrates an embodiment of the present disclosure of the hardware configuration of the service orchestrator which is representative of a hardware environment for practicing the present disclosure.

Referring now to FIG. 3, FIG. 3 illustrates an embodiment of the present disclosure of the hardware configuration of service orchestrator 106 (FIG. 1) which is representative of a hardware environment for practicing the present disclosure.

Service orchestrator 106 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, a program for performing real-time monitoring of machine learning models 201 (FIG. 2) as discussed further below in connection with FIGS. 4-7.

Referring again to FIG. 3, read-only memory ("ROM") 305 is connected to system bus 302 and includes a basic input/output system ("BIOS") that controls certain basic functions of service orchestrator 106. Random access memory ("RAM") 306 and disk adapter 307 are also connected to system bus 302. It should be noted that software components including operating system 303 and application 304 may be loaded into RAM 306, which may be service orchestrator's 106 main memory for execution. Disk adapter 307 may be an integrated drive electronics ("IDE") adapter that communicates with a disk unit 308, e.g., disk drive. It is noted that the program for performing real-time monitoring of machine learning models 201, as discussed further below in connection with FIGS. 4-7, may reside in disk unit 308 or in application 304.

Service orchestrator 106 may further include a communications adapter 309 connected to bus 302. Communications adapter 309 interconnects bus 302 with an outside network (e.g., network 103 of FIG. 1) to communicate with other devices, such as computing devices 101, etc.

In one embodiment, application 304 of service orchestrator 106 includes the software components of service orchestration plane 200. The functions discussed above performed by such components are not generic computer functions. As a result, service orchestrator 106 is a particular machine that is the result of implementing specific, non-generic computer functions.

In one embodiment, the functionality of such software components of service orchestrator 106, including the functionality for performing real-time monitoring of machine learning models, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, in a cognitive system, which uses cognitive computing, natural language processing and machine learning to enable people and machines to interact more naturally to extend and magnify human expertise and cognition, there could be many different machine learning models with different functions and operation feature sets to produce different outcomes. By having a variety of machine learning models, the cognitive system is enhanced in its ability to enable people and machines to interact more naturally. Such a cognitive system may utilize a broadband cellular network, such as the fifth generation technology standard for the broadband cellular network ("5G"). In such an architecture, dissimilar machine learning models reside in the service orchestration plane. The service orchestration plane introduces a parent level of abstraction that alleviates the need for other services to manage interaction details required to ensure that service operations are executed in a specific sequence. As discussed above, in the service orchestration plane, there are multiple dissimilar machine learning models in the service orchestration plane, each operating with different training datasets, using different algorithms to train the model using the different training datasets. Once the machine learning model is selected to be utilized, the outcome of the machine learning model needs to be evaluated in real-time as to the accuracy of the prediction, including in situations involving automated audits of the machine learning model. Unfortunately, there is not currently a means for performing real-time monitoring of the machine learning models in the service orchestration plane. As a result, the performance of such machine learning models in the service orchestration plane may be unknown.

Figure 4:
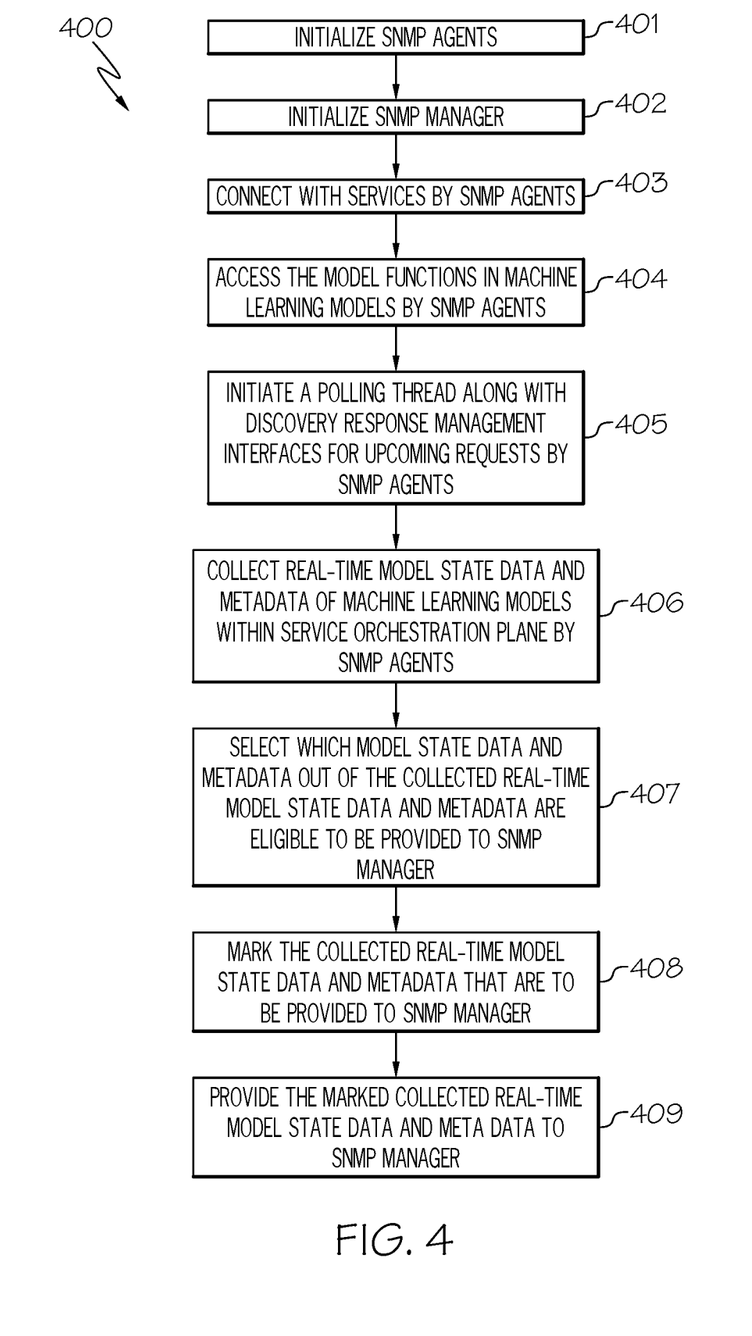
FIG. 4 is a flowchart of a method for performing real-time monitoring of the machine learning models residing within the service orchestration plane of a broadband cellular network in accordance with an embodiment of the present disclosure.
Figure 5:
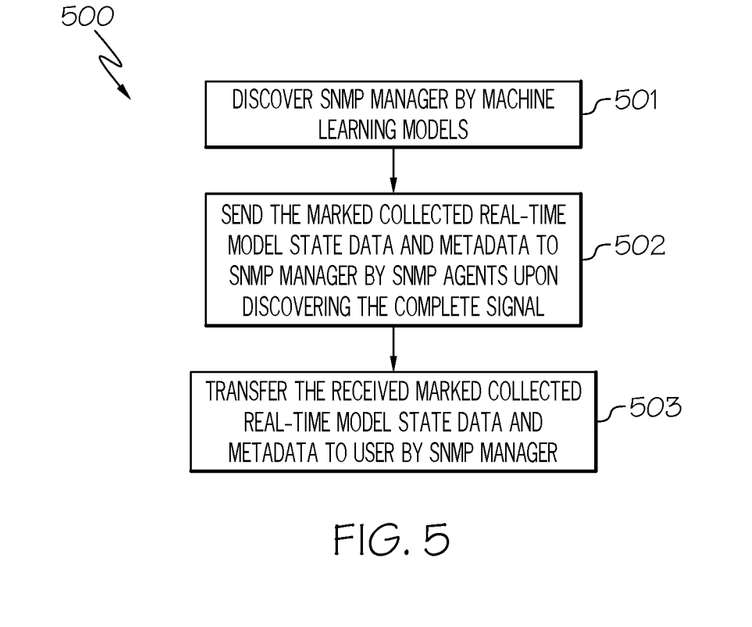
FIG. 5 is a flowchart of a method for providing the marked collected real-time model state data and metadata to the simple network management protocol (SNMP) manager in accordance with an embodiment of the present disclosure.
Figure 6:
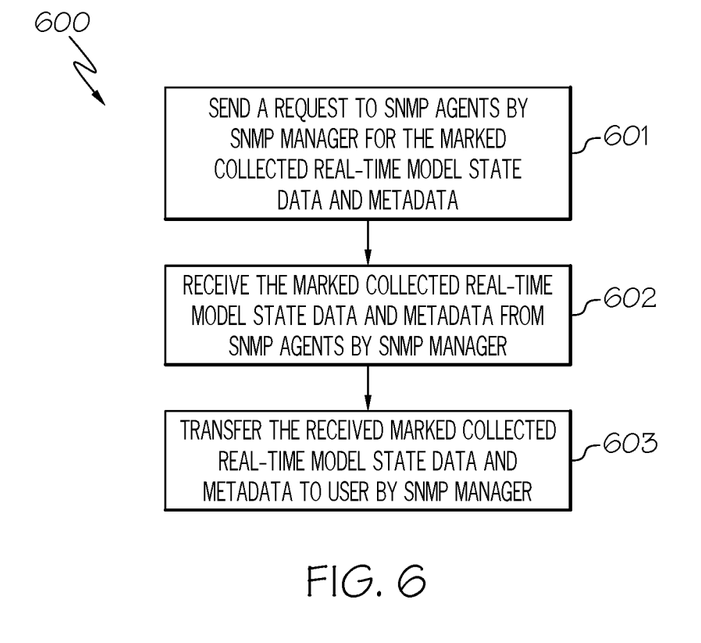
FIG. 6 is a flowchart of an alternative method for providing the marked collected real-time model state data and metadata to the SNMP manager in accordance with an embodiment of the present disclosure.
Figure 7:
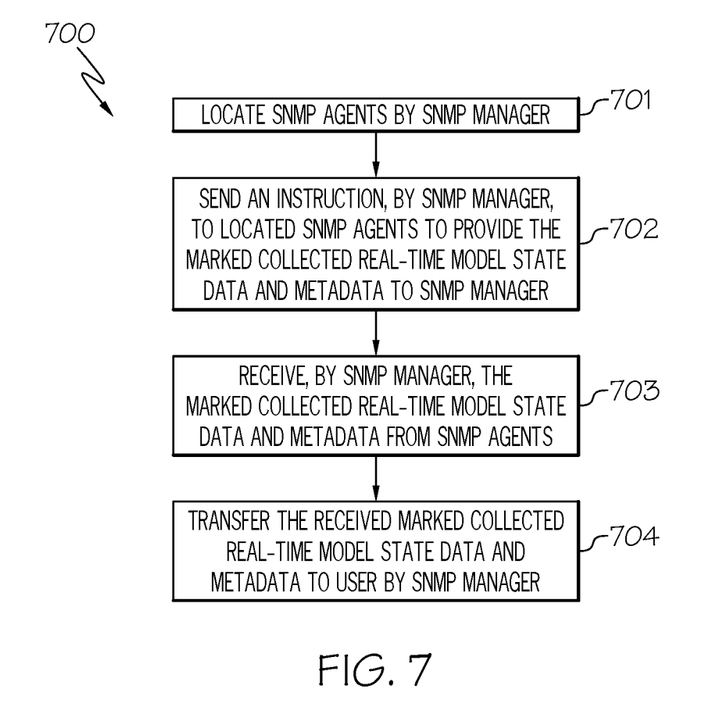
FIG. 7 is a flowchart of a further alternative method for providing the marked collected real-time model state data and metadata to the SNMP manager in accordance with an embodiment of the present disclosure.

The embodiments of the present disclosure provide a means for monitoring the performance of machine learning models in the service orchestration plane of a broadband cellular network (e.g., fifth generation broadband cellular network) using agents (e.g., SNMP agents) within the machine learning models to collect real-time model state data and metadata of the machine learning models as discussed below in connection with FIGS. 4-7. FIG. 4 is a flowchart of a method for performing real-time monitoring of the machine learning models residing within the service orchestration plane of a broadband cellular network. FIG. 5 is a flowchart of a method for providing the marked collected real-time model state data and metadata to the simple network management protocol (SNMP) manager. FIG. 6 is a flowchart of an alternative method for providing the marked collected real-time model state data and metadata to the SNMP manager. FIG. 7 is a flowchart of a further alternative method for providing the marked collected real-time model state data and metadata to the SNMP manager.

As stated above, FIG. 4 is a flowchart of a method 400 for performing real-time monitoring of the machine learning models 201 (FIG. 2) residing within the service orchestration plane 200 (FIG. 2) of a broadband cellular network (e.g., network 103 of FIG. 1) in accordance with an embodiment of the present disclosure.

Referring to FIG. 4, in conjunction with FIGS. 1-3, in step 401, SNMP agents 201 are initialized, such as by initializing itself or by having master service 203 initialize SNMP agents 201. In one embodiment, in its initialization, SNMP agents 201 load the necessary variables and configuration settings for collecting real-time model state data and metadata of machine learning models 201.

In step 402, SNMP manager 204 is initialized. In one embodiment, SNMP manager 204 is initialized by master service 203. In one embodiment, in its initialization, SNMP manager 204 initiates all configuration parsing approaches and performs service authentication to the subscribed monitoring services. Furthermore, in its initialization, metadata mappers and data structures are loaded. Metadata mappers, as used herein, refer to the software components used in the process of metadata mapping, which is a way of associating equivalent metadata values or fields from one system with content in another system. A data structure, as used herein, is a data organization, management, and storage format that enables efficient access and modification.

In step 403, SNMP agents 202 connect with the services. In one embodiment, SNMP agents 202 are connected with the services by master service 203. In one embodiment, SNMP agents 202 connect with the services in case the machine learning models 201 are in a subscription list of SNMP-based monitoring.

In step 404, SNMP agents 202 access the model functions in machine learning models 201. Such "model functions," as used herein, refer to the core set of functions used for making a prediction based on the input received by machine learning model 201. Such model functions are utilized by an algorithm (machine learning algorithm) to generate an output based on the input received by machine learning model 201. In one embodiment, SNMP agent 202 accesses the model functions in machine learning model 201 after machine learning model 201 grants permission to SNMP agent 202 to access such model functions. In one embodiment, by accessing such model functions, SNMP agent 202 is able to collect real-time model state data and metadata of machine learning model 201, such as errors, predictions, etc.

In step 405, SNMP agents 202 initiate a polling thread along with discovery response management interfaces for upcoming requests. A "polling thread," as used herein, refers to a sequential flow of instructions to repeatedly determine if a signal or request, such as a request to begin monitoring machine learning model 201 to capture its real-time model state data and metadata, has been issued. A "discovery response management interface," as used herein, refers to an interface, such as with SNMP manager 204, that is used for SNMP manager 204 to issue requests for SNMP agents 202 to begin collecting the machine learning model's real-time model state data and metadata.

In step 406, SNMP agents 202 collect real-time model state data and metadata of machine learning models 201 within service orchestration plane 200. As discussed above, such real-time model state data and metadata may include the type of machine learning model, an operating dataset, features of a quorum configuration, attributes of the machine learning models, etc. In one embodiment, SNMP agents 202 utilize a monitor function to target information about internal events, machine learning model decision point values, multi-pass information, metadata, etc. In one embodiment, such information may only be collected by SNMP agents 202 if its associated flag is enabled. For example, if the value of the flag is the logical value of one, then the information associated with such a flag may be collected. Otherwise, such information may not be collected.

For each of the machine learning models 201 in which real-time model state data and metadata were collected, the following steps (407-409) occurs.

In step 407, machine learning model 201 selects which model state data and metadata out of the collected real-time model state data and metadata are eligible to be provided to SNMP manager 204 (and ultimately to the user of computing device 101), such as via SNMP GET/GETNEXT/GETBULK/SET or TRAP operations. That is, machine learning model 201 selects a portion of the collected real-time model state data and metadata to be provided to SNMP manager 204 (and ultimately to the user of computing device 101). In one embodiment, such information (model state data and metadata) may be selected based on input received from an expert. In one embodiment, such information (model state data and metadata) may be selected based on prior information previously captured by SNMP agents 202 and provided to SNMP manager 204.

In step 408, the collected real-time model state data and metadata that are to be provided to SNMP manager 204 (i.e., the real-time model state data and metadata selected in step 407) are marked by SNMP agent 202. In one embodiment, such information is marked by setting a value to a flag associated with such information. For example, if the value of the flag is the logical value of one, then the information associated with such a flag may be marked to be provided to SNMP manager 204.

In step 409, the marked collected real-time model state data and metadata are provided to SNMP manager 204, and ultimately to the user of computing device 101, such as in one of the following ways as discussed in FIGS. 5-7.

FIG. 5 is a flowchart of a method 500 for providing the marked collected real-time model state data and metadata to SNMP manager 204 in accordance with an embodiment of the present disclosure.

Referring to FIG. 5, in conjunction with FIGS. 1-4, in step 501, machine learning models 201 discover SNMP manager 204. In one embodiment, machine learning models 201 discover SNMP manager 204 via the TRAP operation. A "TRAP" operation, as used herein, is an alert message sent from machine learning model 201 to a central collector, SNMP manager 204.

In step 502, upon discovering the COMPLETE signal, SNMP agents 202 send the marked collected real-time model state data and metadata to SNMP manager 204. In one embodiment, the COMPLETE signal is issued by SNMP manager 204 to SNMP agents 202 (those agents of machine learning models 201 which discovered SNMP manager 204) to begin sending the marked collected real-time model state data and metadata to SNMP manager 204 after SNMP manager 204 receives an indication from machine learning model 201 of being discovered.

In step 503, SNMP manager 204 transfers the received marked collected real-time model state data and metadata to the user of computing device 101, such as on a demand basis. In one embodiment, such information is in the form of tuples.

An alternative method for providing the marked collected real-time model state data and metadata to SNMP manager 204 is discussed below in connection with FIG. 6.

FIG. 6 is a flowchart of an alternative method 600 for providing the marked collected real-time model state data and metadata to SNMP manager 204 in accordance with an embodiment of the present disclosure.

Referring to FIG. 6, in conjunction with FIGS. 1-4, in step 601, SNMP manager 204 sends a request to SNMP agents 202 for the marked collected real-time model state data and metadata. In one embodiment, such a request is issued by SNMP manger 204 via the SNMP GETNEXT operation.

In step 602, SNMP manager 204 receives the marked collected real-time model state data and metadata from SNMP agents 202. In one embodiment, such information is sent to SNMP manager 204 by SNMP agents 202 over the medium access control (MAC) interface with SNMP manager 204 as a protocol data unit (PDU). In one embodiment, SNMP manager 204 is identified via its universally unique identifier (UUID) (128-bit number used to identify SNMP manager 204).

In step 603, SNMP manager 204 transfers the received marked collected real-time model state data and metadata to the user of computing device 101, such as on a demand basis. In one embodiment, such information is in the form of tuples.

A further alternative method for providing the marked collected real-time model state data and metadata to SNMP manager 204 is discussed below in connection with FIG. 7.

FIG. 7 is a flowchart of a further alternative method 700 for providing the marked collected real-time model state data and metadata to SNMP manager 204 in accordance with an embodiment of the present disclosure.

Referring to FIG. 7, in conjunction with FIGS. 1-4, in step 701, SNMP manager 204 locates SNMP agents 202. In one embodiment, SNMP manager 204 locates SNMP agents 202 using their object identifier.

In step 702, SNMP manager 204 sends an instruction to the located SNMP agents 202 to provide the marked collected real-time model state data and metadata to SNMP manager 204. In one embodiment, such an instruction is sent via the SNMP GETNEXT operation.

In step 703, SNMP manager 204 receives the marked collected real-time model state data and metadata from SNMP agents 202. In one embodiment, SNMP agents 202 start the data proactively after setting the SNMP TRAP operation in response to the ACTIVATE signal being initialized. In one embodiment, SNMP manager 204 initializes the ACTIVATE signal. In one embodiment, a parallel polling thread (sequential flow of instructions to repeatedly determine if a signal has been issued) will be fork()ed (process which creates a copy of itself) by SNMP manager 204 to locate the DISABLE SIGNAL. In this manner, using the polling thread, SNMP manger 204 will repeatedly determine if the DISABLE SIGNAL has been issued by SNMP agents 202. Upon detecting the DISABLE SIGNAL, SNMP manager 204 sends the TRAP_DISABLE signal to SNMP agents 202 to stop the proactive data sharing with SNMP manager 204. In one embodiment, the TRAP_DISABLE signal is sent after execution of the SNMP GET operation. In one embodiment, the polling for the SNMP GETNEXT operation is activated for future messages.

In step 704, SNMP manager 204 transfers the received marked collected real-time model state data and metadata to the user of computing device 101, such as on a demand basis. In one embodiment, such information is in the form of tuples.

In this manner, the performance of machine learning models in the service orchestration plane of a broadband cellular network (e.g., fifth generation broadband cellular network) may be monitored.

As a result of the foregoing, embodiments of the present disclosure provide a means to obtain better internal details from the machine learning models, which are useful in understanding the performance of machine learning models in a multi-domain orchestration and programmability framework.

Furthermore, the embodiments of the present disclosure provide a way to communicate with the machine learning models and receive detailed information from the machine learning models on a standard interface which provides better flexibility of processing verification in the machine learning space.

Furthermore, the principles of the present disclosure improve the technology or technical field involving machine learning models. As discussed above, in a cognitive system, which uses cognitive computing, natural language processing and machine learning to enable people and machines to interact more naturally to extend and magnify human expertise and cognition, there could be many different machine learning models with different functions and operation feature sets to produce different outcomes. By having a variety of machine learning models, the cognitive system is enhanced in its ability to enable people and machines to interact more naturally. Such a cognitive system may utilize a broadband cellular network, such as the fifth generation technology standard for the broadband cellular network ("5G"). In such an architecture, dissimilar machine learning models reside in the service orchestration plane. The service orchestration plane introduces a parent level of abstraction that alleviates the need for other services to manage interaction details required to ensure that service operations are executed in a specific sequence. As discussed above, in the service orchestration plane, there are multiple dissimilar machine learning models in the service orchestration plane, each operating with different training datasets, using different algorithms to train the model using the different training datasets. Once the machine learning model is selected to be utilized, the outcome of the machine learning model needs to be evaluated in real-time as to the accuracy of the prediction, including in situations involving automated audits of the machine learning model. Unfortunately, there is not currently a means for performing real-time monitoring of the machine learning models in the service orchestration plane. As a result, the performance of such machine learning models in the service orchestration plane may be unknown.

Embodiments of the present disclosure improve such technology by providing real-time monitoring of the machine learning models in the service orchestration plane. In one embodiment, real-time model state data and metadata (e.g., type of machine learning model, an operating dataset, features of a quorum configuration, attributes of the machine learning models, etc.) of the machine learning models located within an orchestration plane of a network are collected by agents located within the machine learning models. In one embodiment, such agents utilize the simple network management protocol (SNMP) and are referred to herein as the "SNMP agents." The portion of the collected model state data and metadata that is to be provided to the user by the service orchestrator (configured to monitor the machine learning models in the service orchestration plane via the use of agents in the machine learning models) is selected and marked. In one embodiment, such information (model state data and metadata) may be selected based on input received from an expert. In one embodiment, such information (model state data and metadata) may be selected based on prior information previously captured by the SNMP agents. In one embodiment, the selected information (model state data and metadata) to be provided to the user by the service orchestrator is marked by setting a value to a flag associated with such information. The marked collected real-time model state data and metadata are then provided to the user by the service orchestrator. In this manner, real-time monitoring of the machine learning models in the orchestration plane, such as the service orchestration plane, of a broadband cellular network (e.g., fifth generation broadband cellular network) is achieved. Furthermore, in this manner, there is an improvement in the technical field involving machine learning models.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for performing real-time monitoring of machine learning models, the method comprising:
    collecting real-time model state data and metadata of said machine learning models located within an orchestration plane of a network by agents located within said machine learning models;
    marking a portion of said collected real-time model state data and metadata that was selected to be provided to a user of a computing device; and
    providing said marked collected real-time model state data and metadata to said user of said computing device.

2. The method as recited in claim 1 further comprising:
    sending said marked collected real-time model state data and metadata to a manager located within said orchestration plane of said network by said agents upon discovering a COMPLETE signal.

3. The method as recited in claim 1 further comprising:
sending said marked collected real-time model state data and metadata to a manager located within said orchestration plane of said network by said agents as a protocol data unit.

4. The method as recited in claim 1 further comprising:
sending said marked collected real-time model state data and metadata to a manager located within said orchestration plane of said network by said agents in response to an ACTIVATE signal being initialized.

5. The method as recited in claim 1, wherein said agents utilize a simple network management protocol.

6. The method as recited in claim 1, wherein said marked collected real-time data and metadata comprise one or more of the following: a type of machine learning model, an operating dataset, features of a quorum configuration, and attributes of machine learning models.

7. The method as recited in claim 1, wherein said network is a broadband cellular network.

8. A computer program product for performing real-time monitoring of machine learning models, the computer program product comprising one or more computer readable storage mediums having program code embodied therewith, the program code comprising programming instructions for:
collecting real-time model state data and metadata of said machine learning models located within an orchestration plane of a network by agents located within said machine learning models;
marking a portion of said collected real-time model state data and metadata that was selected to be provided to a user of a computing device; and
providing said marked collected real-time model state data and metadata to said user of said computing device.

9. The computer program product as recited in claim 8, wherein the program code further comprises the programming instructions for:
sending said marked collected real-time model state data and metadata to a manager located within said orchestration plane of said network by said agents upon discovering a COMPLETE signal.

10. The computer program product as recited in claim 8, wherein the program code further comprises the programming instructions for:
sending said marked collected real-time model state data and metadata to a manager located within said orchestration plane of said network by said agents as a protocol data unit.

11. The computer program product as recited in claim 8, wherein the program code further comprises the programming instructions for:
sending said marked collected real-time model state data and metadata to a manager located within said orchestration plane of said network by said agents in response to an ACTIVATE signal being initialized.

12. The computer program product as recited in claim 8, wherein said agents utilize a simple network management protocol.

13. The computer program product as recited in claim 8, wherein said marked collected real-time data and metadata comprise one or more of the following: a type of machine learning model, an operating dataset, features of a quorum configuration, and attributes of machine learning models.

14. The computer program product as recited in claim 8, wherein said network is a broadband cellular network.

15. A system, comprising:
a memory for storing a computer program for performing real-time monitoring of machine learning models; and
a processor connected to said memory, wherein said processor is configured to execute program instructions of the computer program comprising:
collecting real-time model state data and metadata of said machine learning models located within an orchestration plane of a network by agents located within said machine learning models;
marking a portion of said collected real-time model state data and metadata that was selected to be provided to a user of a computing device; and
providing said marked collected real-time model state data and metadata to said user of said computing device.

16. The system as recited in claim 15, wherein the program instructions of the computer program further comprise:
sending said marked collected real-time model state data and metadata to a manager located within said orchestration plane of said network by said agents upon discovering a COMPLETE signal.

17. The system as recited in claim 15, wherein the program instructions of the computer program further comprise:
sending said marked collected real-time model state data and metadata to a manager located within said orchestration plane of said network by said agents as a protocol data unit.

18. The system as recited in claim 15, wherein the program instructions of the computer program further comprise: sending said marked collected real-time model state data and metadata to a manager
located within said orchestration plane of said network by said agents in response to an ACTIVATE signal being initialized.

19. The system as recited in claim 15, wherein said agents utilize a simple network management protocol.

20. The system as recited in claim 15, wherein said marked collected real-time data and metadata comprise one or more of the following: a type of machine learning model, an operating dataset, features of a quorum configuration, and attributes of machine learning models.

* * * * *